United States Patent
Chu et al.

(10) Patent No.: US 7,744,218 B1
(45) Date of Patent: Jun. 29, 2010

(54) PUPIL POSITION ACQUISITION SYSTEM, METHOD THEREFOR, AND DEVICE CONTAINING COMPUTER SOFTWARE

(75) Inventors: Chia-Te Chu, Tainan (TW); Jui-Tang Lin, Tainan County (TW); Chin-Shun Hsu, Kaohsiung (TW)

(73) Assignee: Institute For Information Industry, Taipei (TW)

( * ) Notice: Subject to any disclaimer, the term of this patent is extended or adjusted under 35 U.S.C. 154(b) by 14 days.

(21) Appl. No.: 12/342,966

(22) Filed: Dec. 23, 2008

(30) Foreign Application Priority Data

Dec. 12, 2008 (TW) .............................. 97148389 A

(51) Int. Cl.
*A61B 3/14* (2006.01)
(52) U.S. Cl. ...................... 351/208; 351/206; 382/117
(58) Field of Classification Search ................. 351/208, 351/206, 209, 210, 220, 221, 205, 246, 247; 382/117, 110, 118, 190, 236; 606/4, 5, 6; 396/185
See application file for complete search history.

(56) References Cited

U.S. PATENT DOCUMENTS

| | | | | |
|---|---|---|---|---|
| 6,247,813 B1 * | 6/2001 | Kim et al. | .................... | 351/206 |
| 7,044,602 B2 * | 5/2006 | Chernyak | .................... | 351/208 |
| 7,616,785 B2 * | 11/2009 | Kondo et al. | ................. | 382/117 |

* cited by examiner

*Primary Examiner*—Hung X Dang
(74) *Attorney, Agent, or Firm*—Morris, Manning & Martin LLP; Tim Tingkang Xia

(57) ABSTRACT

A system and pupil position acquisition method and a device containing computer software for executing the same are provided. The system includes a shooting module, a scanning module, a signal transformation module, and a signal analysis module. The shooting module shoots an eyeball image using an image shooting device, such as a charge-coupled device (CCD) camera. The scanning module scans the eyeball image to acquire an eyeball signal. The signal transformation module performs a wavelet transform on the eyeball signal. The signal analysis module analyzes the eyeball signal after the wavelet transform to acquire a signal interval, and analyzes and acquires a position of a pupil with respect to the eyeball image according to the signal interval.

23 Claims, 9 Drawing Sheets

PUPIL POSITION ACQUISITION SYSTEM, METHOD THEREFOR, AND DEVICE CONTAINING COMPUTER SOFTWARE

CROSS-REFERENCE TO RELATED APPLICATION

This application claims the benefit of Taiwan Patent Application No. 097148389, filed on Dec. 12, 2008, which is hereby incorporated by reference for all purposes as if fully set forth herein.

BACKGROUND OF THE INVENTION

1. Field of the Invention

The present invention relates to a pupil position acquisition system and method and a device containing computer software for executing the same, and more particularly to a pupil position acquisition system and method and a device containing computer software for executing the same which use the wavelet transform to analyze an eyeball image signal so as to acquire a pupil position.

2. Related Art

The pupil tracking method is a technique used widely in the field of medicine, which is mainly applicable to the patients with severe disabilities, an extreme disability such as amyotrophic lateral sclerosis (ALS) or severe cerebral palsy deprive them of the use of their limbs and facial muscles. If eye motion is unaffected, the patient could rely on a pupil tracking method to attain or regain some degrees of independent living and control in conjunction with equipments having a human-machine interface.

However, in the conventional pupil tracking technique, for example, a cornea and pupil reflection, a camera receives the light reflected from the eye to form an eye image as different parts of the eye have different reflectivities to the light, and then the movement and the position of the eye are determined through image processing. In the cornea and pupil reflection, binary images are processed, and the Hough transform technique or circular sample is applied to look for or contrast a boundary of the pupil circumference based on the image processing technique, and thus it is time consuming when acquiring the threshold value of the pupil and the noise interference is easily generated, resulting in undesirable accuracy of the acquired pupil position.

SUMMARY OF THE INVENTION

The present invention is directed to a pupil position acquisition system and method and a device containing computer software for executing the same, which use a wavelet transform to analyze an eyeball image signal to acquire a pupil position.

Accordingly, the present invention provides a pupil position acquisition system, which includes a shooting module, a scanning module, a signal transformation module, and a signal analysis module. The shooting module shoots an eyeball image using an image shooting device, such as a charge-coupled device (CCD) camera. The scanning module scans the eyeball image to acquire an eyeball signal. The signal transformation module performs a wavelet transform on the eyeball signal. The signal analysis module analyzes the eyeball signal after the wavelet transform to acquire a signal interval, and analyzes and acquires a position of a pupil with respect to the eyeball image according to the signal interval.

The present invention further provides a pupil position acquisition method, which acquires an eyeball image using an image shooting device, such as a CCD camera, and performs a scanning procedure on the eyeball image to acquire an eyeball signal. Then a wavelet transform is performed on the eyeball signal, and the eyeball signal after the wavelet transform is analyzed to acquire a signal interval. A position of a pupil with respect to the eyeball image is analyzed and acquired according to the signal interval.

The present invention also provides a device containing computer software. A pupil position acquisition method is performed through the software. The pupil position acquisition method includes the following steps. An eyeball image is acquired, and a scanning procedure is performed on the eyeball image to acquire an eyeball signal. Then a wavelet transform is performed on the eyeball signal, and the eyeball signal after the wavelet transform is analyzed to acquire a signal interval. A position of a pupil with respect to the eyeball image is analyzed and acquired according to the signal interval.

The efficacy obtained by applying the present invention lies in that a position of a pupil with respect to an eyeball image can be easily analyzed and acquired through a wavelet transform.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

In order to make above purposes, features, and characteristics more apparent, the embodiments related to the present invention are illustrated as follows in detail in conjunction with the drawings.

Figure 1:
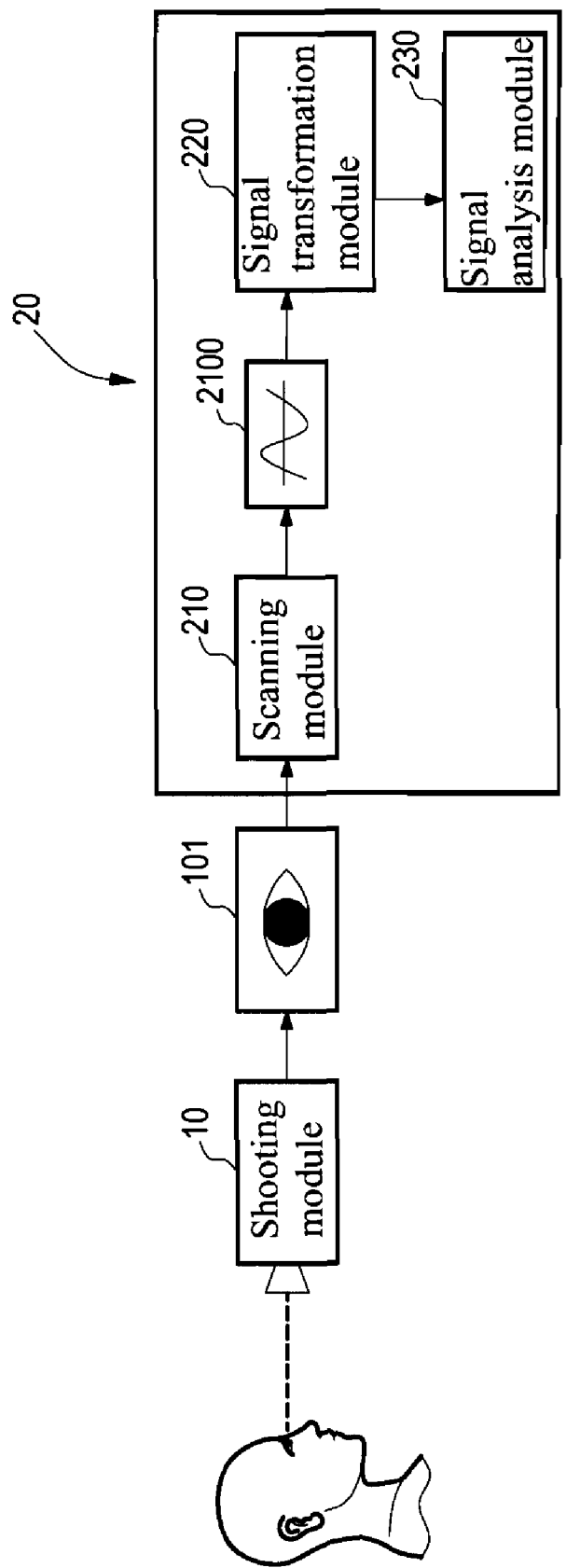
FIG. 1 is an architectural view of a system of the present invention.

FIG. 1 is an architectural view of a system of the present invention. Referring to FIG. 1, the pupil position acquisition system described in the present invention includes a shooting module 10 and a servo device 20. The servo device 20 includes a scanning module 210, a signal transformation module 220, and a signal analysis module 230.

The shooting module 10 shoots an eyeball image 101 of a subject utilizing an image shooting device. The scanning module 210 is used to scan the eyeball image 101 to acquire a digital eyeball signal 2100. The signal transformation module 220 performs a wavelet transform on the digital eyeball signal 2100. The signal analysis module 230 analyzes the digital eyeball signal 2100 after the wavelet transform to acquire a signal interval, and analyzes and acquires a position of a pupil with respect to the eyeball image 101 according to the signal interval.

Figure 2:
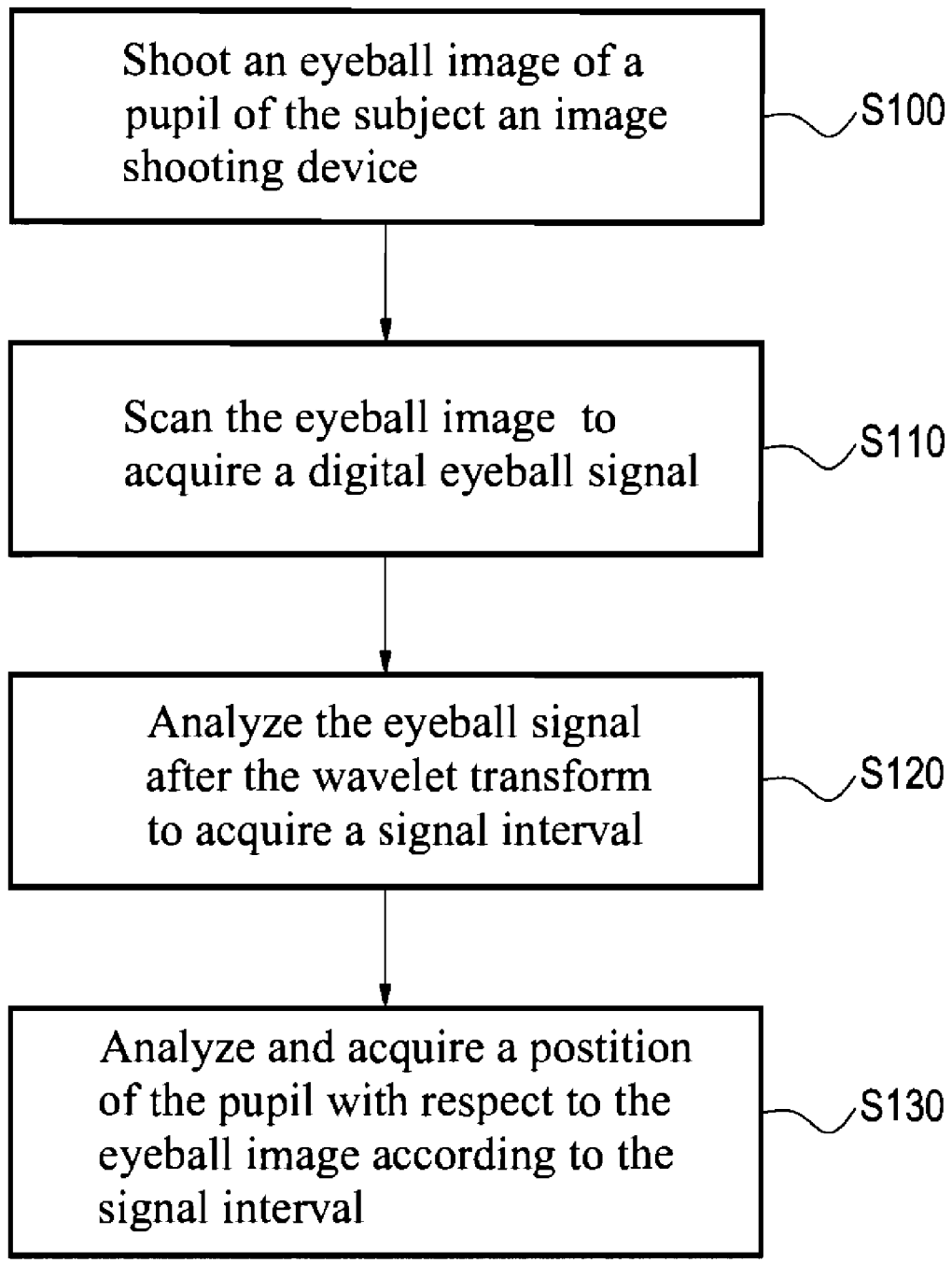
FIG. 2 is a schematic view of a working flow of the present invention.
Figure 3:
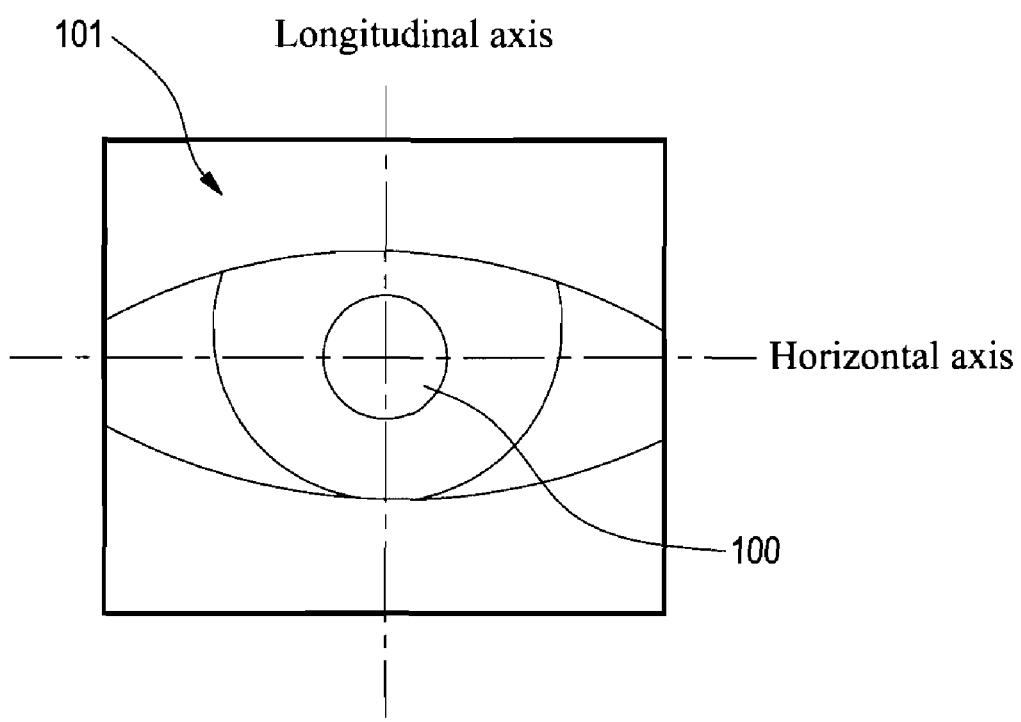
FIG. 3 is a schematic view of acquiring an eyeball image according to the present invention.

Referring to FIGS. 2 and 3, FIG. 2 is a schematic view of a working flow of the present invention, and FIG. 3 is a schematic view of acquiring an eyeball image according to the present invention.

When it is intended to acquire a position of a pupil 100 of a subject, the shooting module 10, such as a CCD camera, can be used to shoot an eyeball image 101 of a pupil of the subject (Step S100). An image capture card or an image program installed in the computer is utilized to capture the eyeball image 101 as shown in FIG. 3. Then a vertical scanning and a horizontal scanning are performed by the scanning module 210 on each of the longitudinal axis and the horizontal axis within the range of the eyeball image 101 respectively, so as to acquire a digital eyeball signal 2100 of the eyeball image 101 (Step S110).

After the digital eyeball signal 2100 is acquired, a signal transformation module 220 is utilized to perform the wavelet transform on the digital eyeball signal 2100. A high frequency analysis and a low frequency analysis are performed on the digital eyeball signal 2100 by the signal analysis module 230. The formulas of the high frequency analysis and the low frequency analysis of the wavelet transform are as follows respectively:

$$D=(s,H) \quad \text{(Formula 1)}$$

$$A=(s,L) \quad \text{(Formula 2),}$$

in which s is the digital eyeball signal 2100, H is a high frequency filter factor of the wavelet transform, the high frequency signal D is a convolution result of the digital eyeball signal 2100 and the high frequency filter factor H. L is a low frequency filter factor of the wavelet transform, A is a low frequency signal of the digital eyeball signal 2100, and the low frequency signal A is a convolution result of the digital eyeball signal 2100 and the low frequency filter factor L.

Figure 4A:
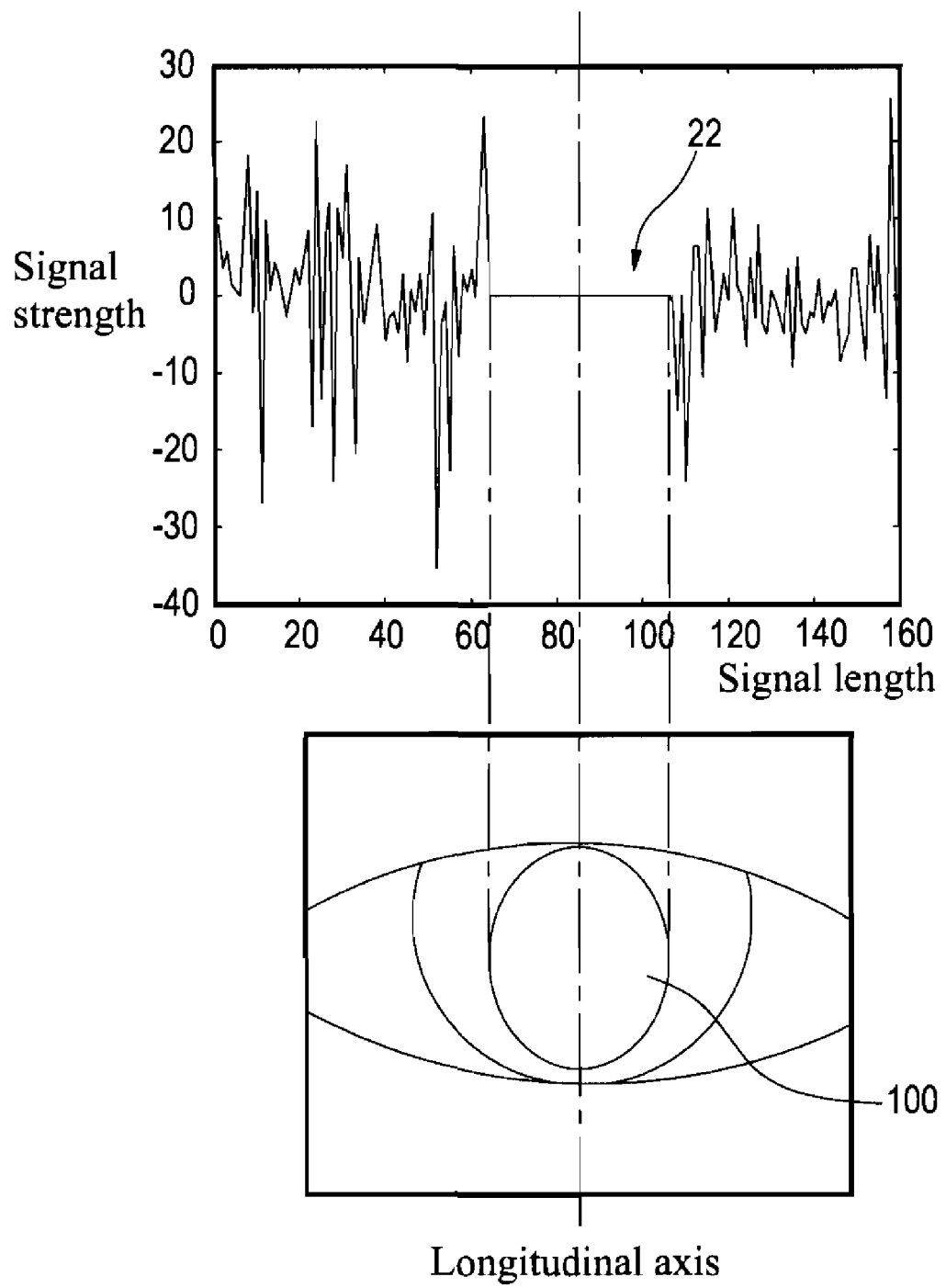
FIG. 4A is a schematic view of acquiring a high frequency signal after a wavelet transform performed on a digital eyeball signal at the longitudinal axis according to the present invention.
Figure 4B:
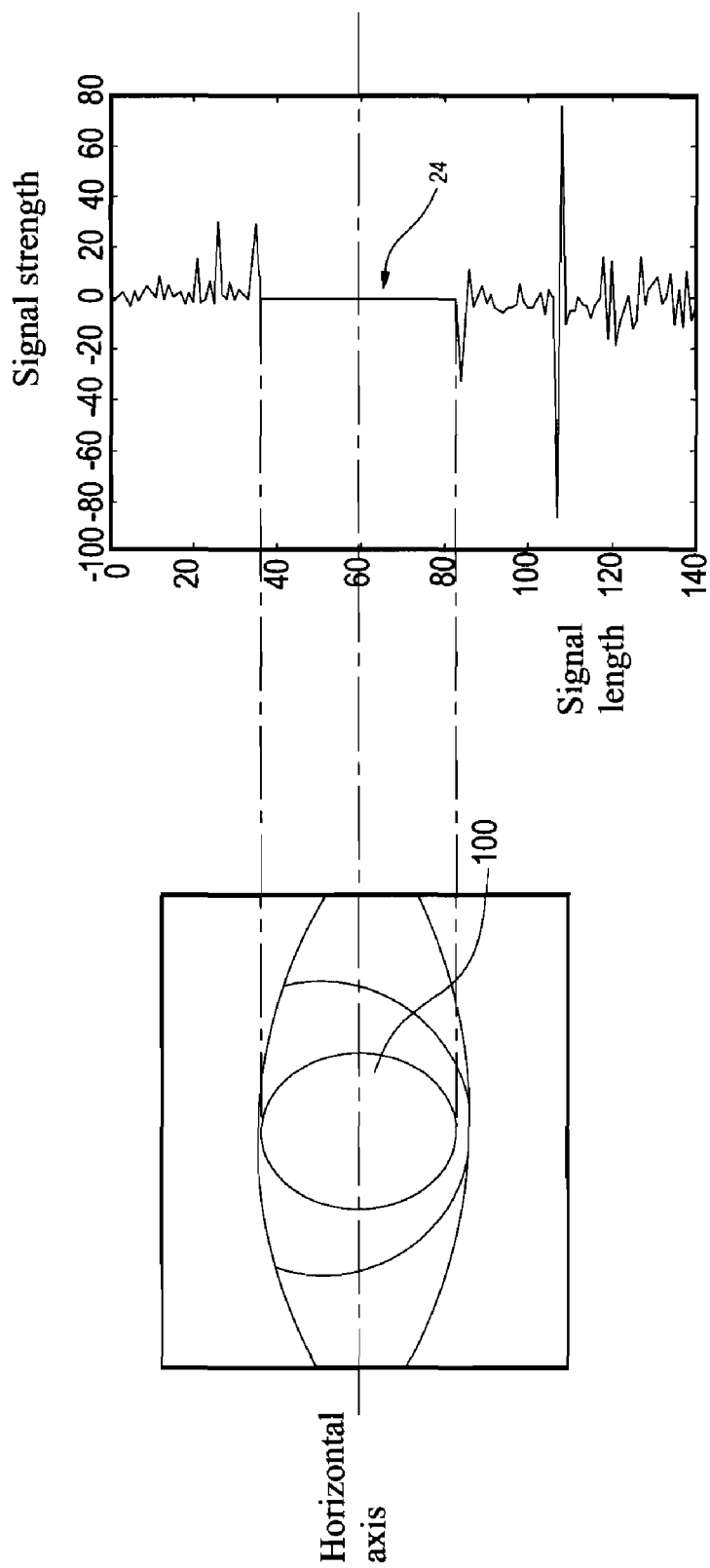
FIG. 4B is a schematic view of acquiring a high frequency signal after a wavelet transform performed on a digital eyeball signal at the horizontal axis according to the present invention.
Figure 4C:
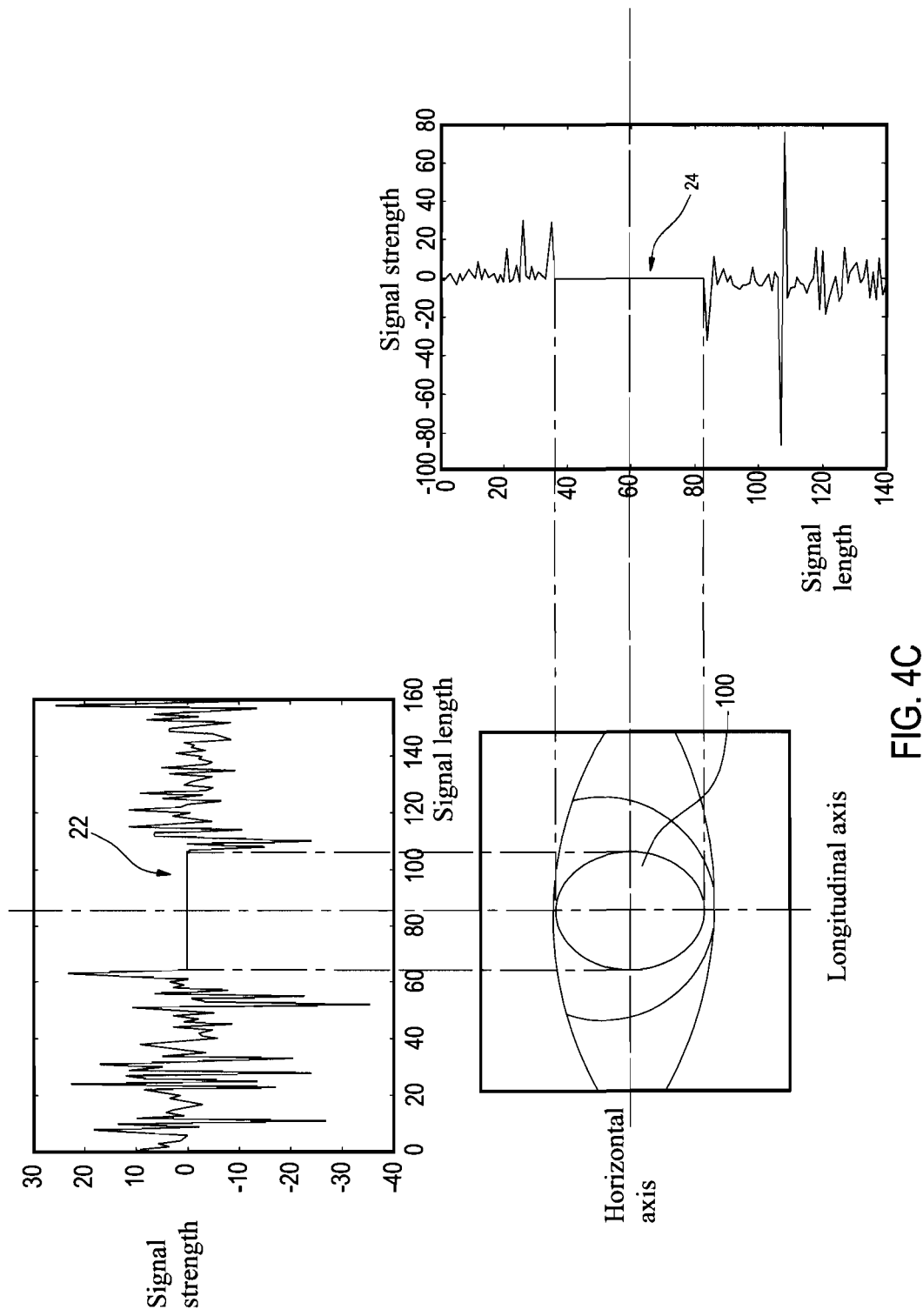
FIG. 4C is a schematic view of matching the high frequency signal at the longitudinal axis in FIG. 4A with the high frequency signal at the horizontal axis in FIG. 4B to acquire a pupil position according to the present invention.

Referring to FIGS. 4A, 4B and 4C together, FIG. 4A is a schematic view of acquiring a high frequency signal after a wavelet transform performed on a digital eyeball signal at the longitudinal axis according to the present invention, FIG. 4B is a schematic view of acquiring a high frequency signal after a wavelet transform performed on a digital eyeball signal at the horizontal axis according to the present invention, and FIG. 4C is a schematic view of matching the high frequency signal at the longitudinal axis in FIG. 4A with the high frequency signal at the horizontal axis in FIG. 4B to acquire a pupil position according to the present invention.

After the wavelet transform at the longitudinal axis and at the horizontal axis is performed on the digital eyeball signal 2100, a high frequency signal at the longitudinal axis as shown in FIG. 4A and a high frequency signal at the horizontal axis as shown in FIG. 4B are obtained respectively. It can be observed clearly from FIGS. 4A and 4B that the digital eyeball signals 2100 at the longitudinal axis and at the horizontal axis after wavelet transform have a signal interval 22 and a signal interval 24 respectively (Step S120).

Normally, the variance of wavelet transform coefficients from the mutual subtraction of pixels is small when the pupil 100 is in the low frequency band. Therefore, the frequency of both signal intervals is zero, which is the position of the longitudinal axis and the horizontal axis of the pupil 100. The signal interval 22 is the length of the pupil 100, and the signal interval 24 is the width of the pupil 100. The position of the pupil 100 is analyzed and obtained according to a zero-crossing rate principle. The zero-crossing rate is the number of times of the signal amplitude crossing zero in the digital eyeball signal. The range of the largest number of times of crossing zero consecutively is retrieved, and it is also necessary to set at least how many times to cross zero consecutively to obtain the position of the pupil 100. Then, the high frequency signal at the longitudinal axis in FIG. 4A is matched with the high frequency signal at the horizontal axis in FIG. 4B to acquire the position of the pupil 100 accurately as shown in FIG. 4C (Step S130).

Figure 5A:
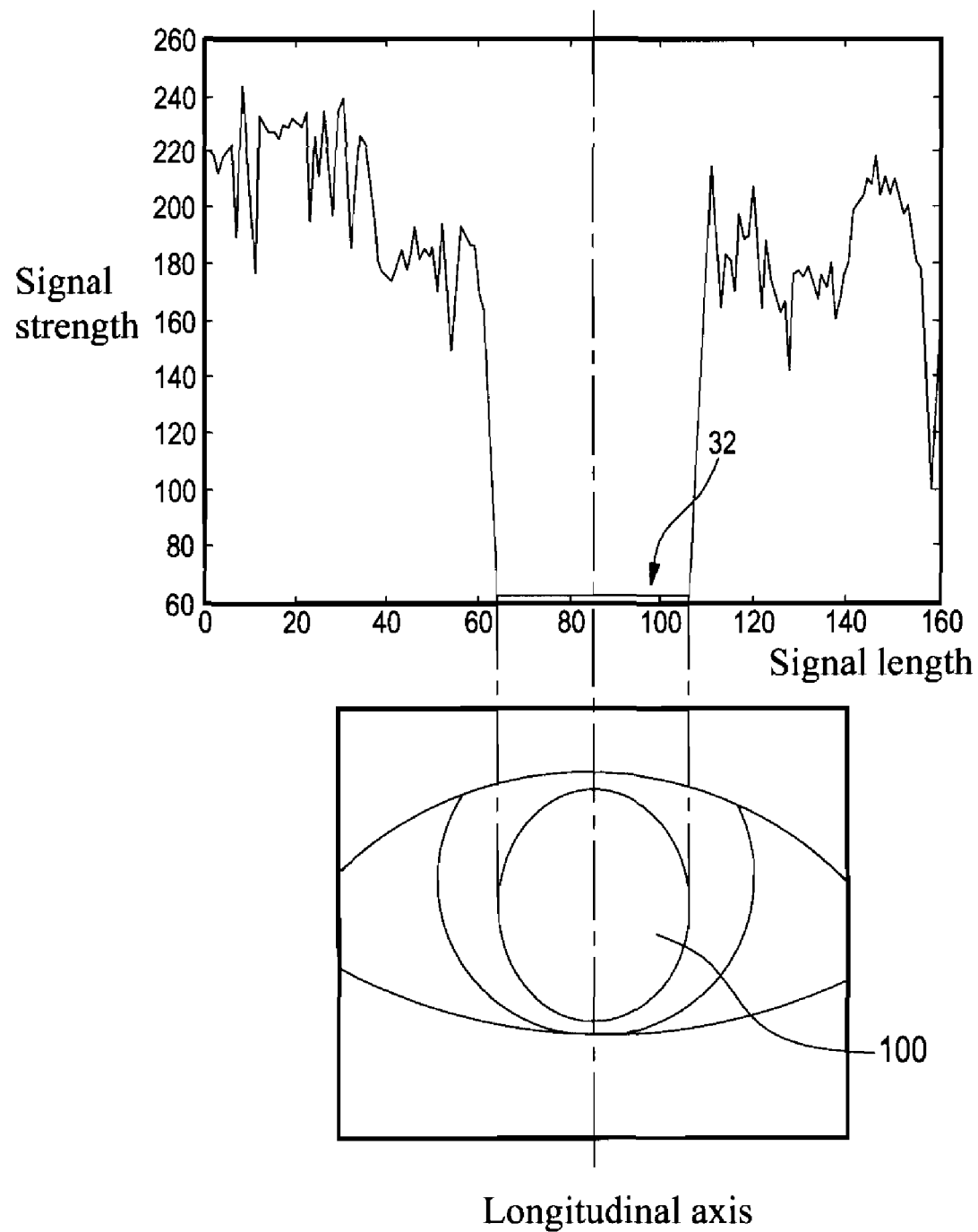
FIG. 5A is a schematic view of acquiring a low frequency signal after an wavelet transform performed on a digital eyeball signal at the longitudinal axis according to the present invention.
Figure 5B:
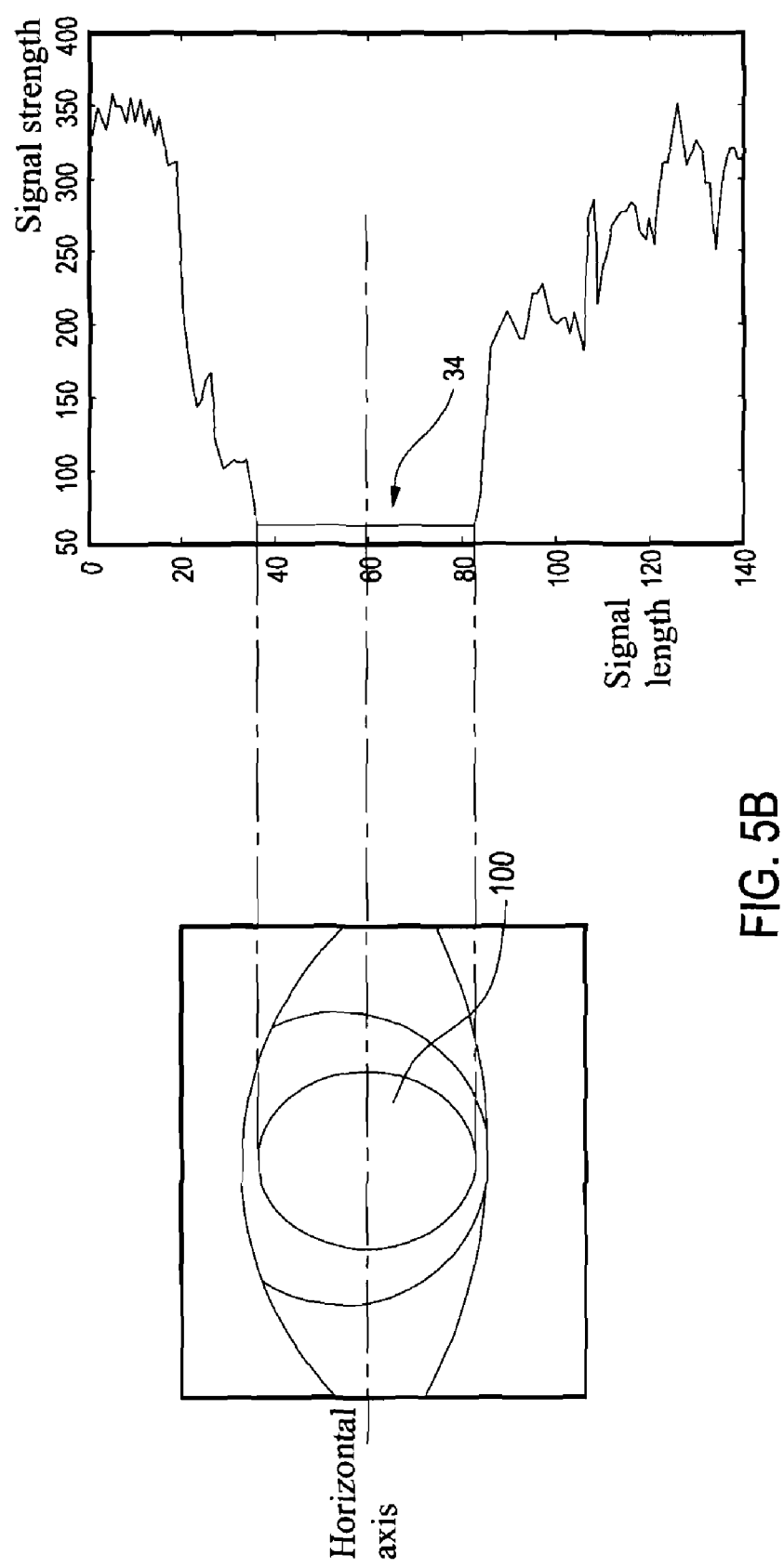
FIG. 5B is a schematic view of acquiring a low frequency signal after an wavelet transform performed on a digital eyeball signal at the horizontal axis according to the present invention.
Figure 5C:
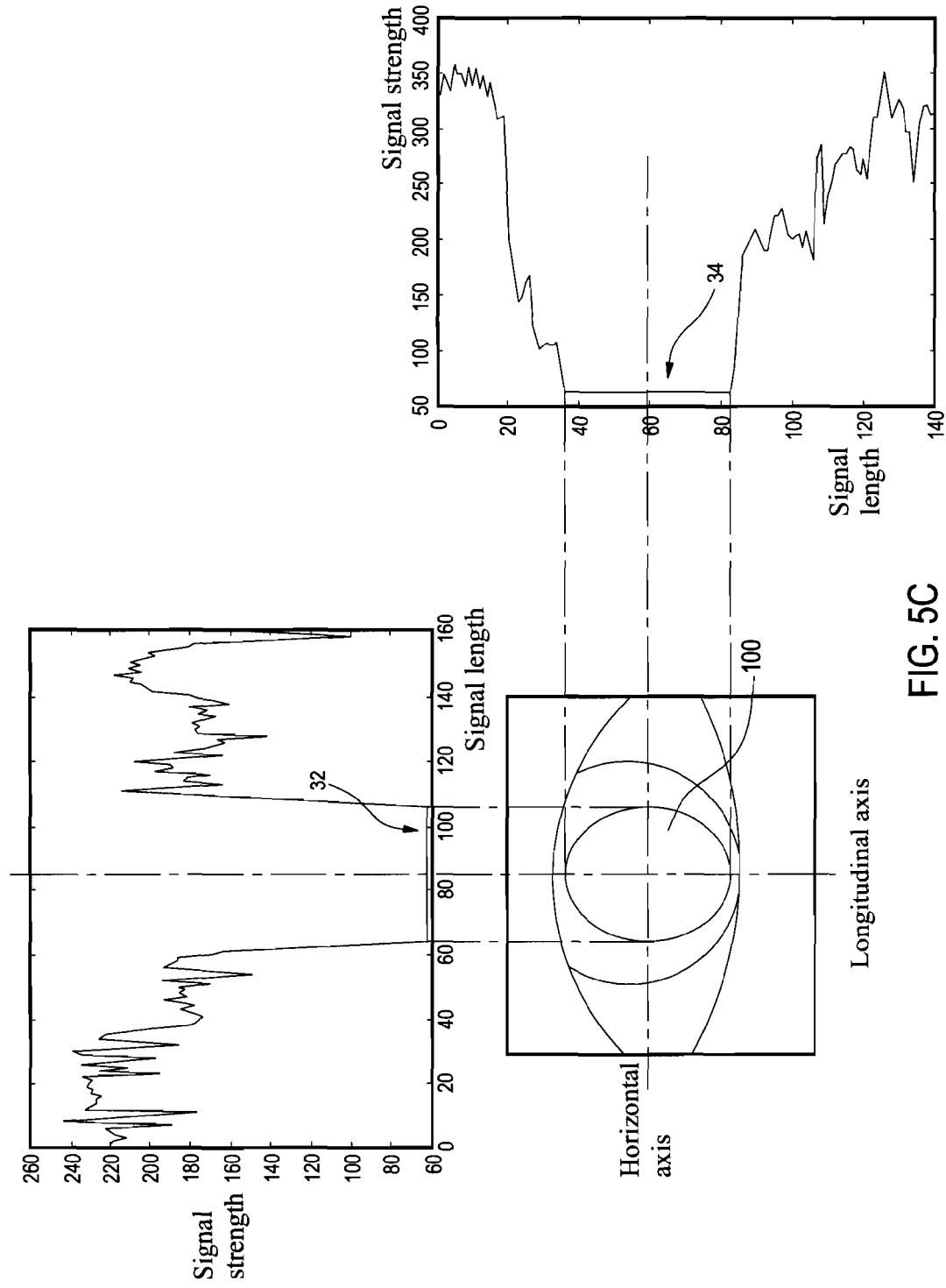
FIG. 5C is a schematic view of matching the low frequency signal at the longitudinal axis in FIG. 5A with the low frequency signal at the horizontal axis in FIG. 5B to acquire a pupil position according to the present invention.

Referring to FIGS. 5A and 5B, FIG. 5A is a schematic view of acquiring a low frequency signal after the wavelet transform performed on the digital eyeball signal at the longitudinal axis according to the present invention, FIG. 5B is a schematic view of acquiring a low frequency signal after the wavelet transform performed on the digital eyeball signal at the horizontal axis according to the present invention, and FIG. 5C is a schematic view of matching the low frequency signal at the longitudinal axis in FIG. 5A with the low frequency signal at the horizontal axis in FIG. 5B to acquire a pupil position according to the present invention.

Similarly, after the wavelet transform at the longitudinal axis and at the horizontal axis is performed on the digital eyeball signal 2100, a low frequency signal at the longitudinal axis as shown in FIG. 5A and a low frequency signal at the horizontal axis as shown in FIG. 5B are obtained respectively. It can be observed clearly from FIGS. 5A and 5B that the digital eyeball signals at the longitudinal axis and at the horizontal axis after transform have a signal interval 32 and a signal interval 34 respectively (Step S120). The signal interval 32 is the length of the pupil 100, and the signal interval 34 is the width of the pupil 100.

Normally, the variance of wavelet transform coefficients from the sum of pixels is small when the pupil 100 is in the low frequency band. Therefore, the frequency of both signal intervals is a particular constant value in a consecutive time, which is the position of the longitudinal axis and the horizontal axis of the pupil 100. The signal interval 32 and the signal interval 34 are acquired by analyzing a signal length of the two low frequency signals crossing a particular ratio of the constant frequency in a consecutive time. Then, the low frequency signal at the longitudinal axis in FIG. 5A and the low frequency signal at the horizontal axis in FIG. 5B are matched to acquire a pupil position as shown in FIG. 5C (Step S130).

It is known from above that the pupil position acquisition method described in the present invention has the following features.

1. The pupil position of a subject may be found quickly by utilizing the image processing technique of the wavelet transform. Thus, if the technique is applied to a wearable computer, the limb disabled people can enjoy the performance of eye operations by operating the cursor of a computer mouse through eye motions.

2. For the patients with severe disabilities, an extreme disability such as amyotrophic lateral sclerosis (ALS) or severe cerebral palsy deprives them of the use of their limbs and facial muscles, the person could rely on this technique to attain or regain some degrees of independent communication and control.

To sum up, the present invention is recorded only to present the preferred implementation methods or embodiments of the technology means adopted to solve the problems, instead of limiting the scope of the present invention. That is, equivalent variations or modifications consistent with the claims of the present invention all fall within the scope of the present invention.

What is claimed is:

1. A pupil position acquisition system, comprising:
   a shooting module, for shooting an eyeball image;
   a scanning module, for scanning the eyeball image to acquire an eyeball signal;
   a signal transformation module, for performing a wavelet transform on the eyeball signal; and
   a signal analysis module, for analyzing the eyeball signal after the wavelet transform to acquire a signal interval, and analyzing and acquiring a position of a pupil with respect to the eyeball image according to the signal interval.

2. The pupil position acquisition system according to claim 1, wherein the shooting module is a Charge-coupled Device (CCD) camera.

3. The pupil position acquisition system according to claim 1, wherein the scanning module vertically scans the eyeball image to acquire the eyeball signal.

4. The pupil position acquisition system according to claim 1, wherein the scanning module horizontally scans the eyeball image to acquire the eyeball signal.

5. The pupil position acquisition system according to claim 1, wherein formulas of the wavelet transform to acquire the signal interval are:

$$D=(s,H)$$

$$A=(s,L),$$

wherein s is the eyeball signal, H is a high frequency filter factor of the wavelet transform, D is a high frequency signal of the eyeball signal, the high frequency signal is a convolution result of the eyeball signal and the high frequency filter factor, L is a low frequency filter factor of the wavelet transform, A is a low frequency signal of the eyeball signal, and the low frequency signal is a convolution result of the eyeball signal and the low frequency filter factor.

6. The pupil position acquisition system according to claim 5, wherein the signal interval is a zero frequency, and the signal interval is analyzed and acquired according to a ratio of the high frequency signal crossing the zero frequency within a consecutive time.

7. The pupil position acquisition system according to claim 5, wherein the low frequency signal is a particular frequency in the signal interval, and the signal interval is analyzed and acquired according to a ratio of the low frequency signal crossing the particular frequency within a consecutive time.

8. A pupil position acquisition method, comprising:
   acquiring an eyeball image;
   scanning the eyeball image to acquire an eyeball signal;
   performing a wavelet transform on the eyeball signal, and analyzing the eyeball signal after the wavelet transform to acquire a signal interval; and
   analyzing and acquiring a position of a pupil with respect to the eyeball image according to the signal interval.

9. The pupil position acquisition method according to claim 8, wherein the eyeball image is acquired by an image shooting device.

10. The pupil position acquisition method according to claim 9, wherein the image shooting device is a Charge-coupled Device (CCD) camera.

11. The pupil position acquisition method according to claim 8, wherein the eyeball signal is acquired by vertically scanning the eyeball image.

12. The pupil position acquisition method according to claim 8, wherein the eyeball signal is acquired by horizontally scanning the eyeball image.

13. The pupil position acquisition method according to claim 8, wherein formulas of the wavelet transform to acquire the signal interval are:

$$D=(s,H)$$

$$A=(s,L)$$

wherein s is the eyeball signal, H is a high frequency filter factor of the wavelet transform, D is a high frequency signal of the eyeball signal, the high frequency signal is a convolution result of the eyeball signal and the high frequency filter factor, L is a low frequency filter factor of the wavelet transform, A is a low frequency signal of the eyeball signal, and the low frequency signal is a convolution result of the eyeball signal and the low frequency filter factor.

14. The pupil position acquisition method according to claim 13, wherein the signal interval is a zero frequency, and the signal interval is analyzed and acquired according to a ratio of the high frequency signal crossing the zero frequency within a consecutive time.

15. The pupil position acquisition method according to claim 13, wherein the low frequency signal is a particular frequency in the signal interval, and the signal interval is analyzed and acquired according to a ratio of the low frequency signal crossing the particular frequency within a consecutive time.

16. A device containing computer software, applicable for performing a pupil position acquisition method through a computer software, wherein the pupil position acquisition method comprises:
   acquiring an eyeball image;
   scanning the eyeball image to acquire an eyeball signal;
   performing a wavelet transform on the eyeball signal, and analyzing the eyeball signal after the wavelet transform to acquire a signal interval; and
   analyzing and acquiring a position of a pupil with respect to the eyeball image according to the signal interval.

17. The device containing computer software according to claim 16, wherein the eyeball image is acquired by an image shooting device.

18. The device containing computer software according to claim 17, wherein the image shooting device is a Charge-coupled Device (CCD) camera.

19. The device containing computer software according to claim 17, wherein the eyeball signal is acquired by vertically scanning the eyeball image.

20. The device containing computer software according to claim 16, wherein the eyeball signal is acquired by horizontally scanning the eyeball image.

21. The device containing computer software according to claim 16, wherein formulas of the wavelet transform to acquire the signal interval are:

$D=(s,H)$ $A=(s,L)$ wherein s is the eyeball signal, H is a high frequency filter factor of the wavelet transform, D is a high frequency signal of the eyeball signal, the high frequency signal is a convolution result of the eyeball signal and the high frequency filter factor, L is a low frequency filter factor of the wavelet transform, A is a low frequency signal of the eyeball signal, and the low frequency signal is a convolution result of the eyeball signal and the low frequency filter factor.

22. The device containing computer software according to claim 21, wherein the signal interval is a zero frequency, and the signal interval is analyzed and acquired according to a ratio of the high frequency signal crossing the zero frequency within a consecutive time.

23. The device containing computer software according to claim 21, wherein the low frequency signal is a particular frequency in the signal interval, and the signal interval is analyzed and acquired according to a ratio of the low frequency signal crossing the particular frequency within a consecutive time.

* * * * *